N. FRYMAN.
HAY GATHERER.
APPLICATION FILED JULY 17, 1909.
943,533.
Patented Dec. 14, 1909.
3 SHEETS—SHEET 3.
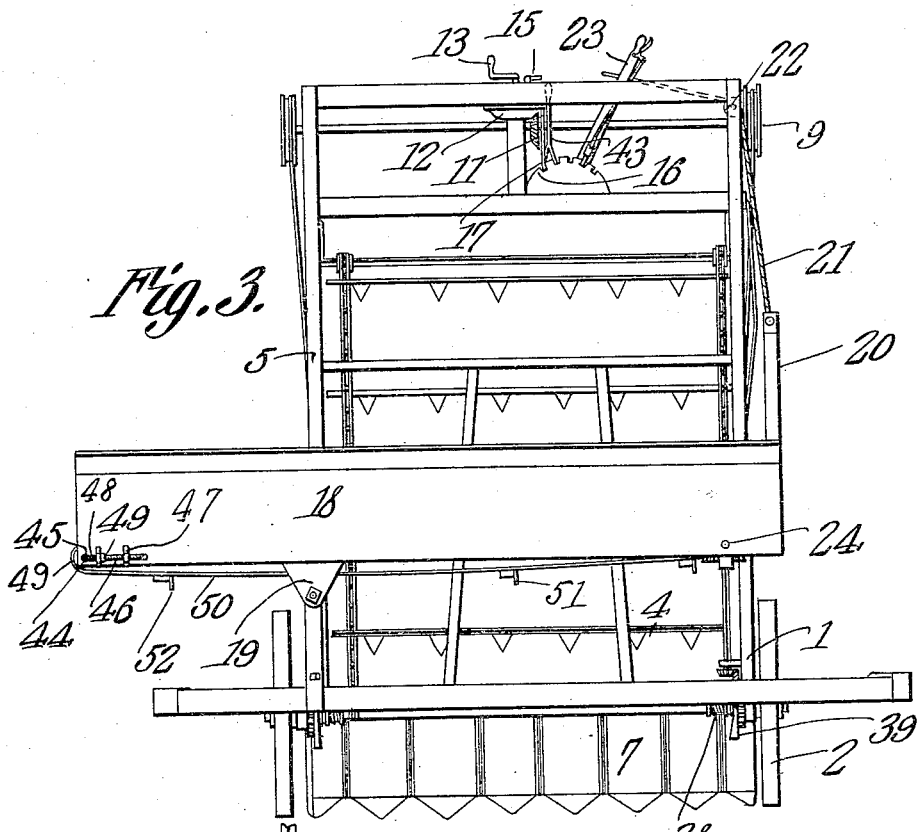
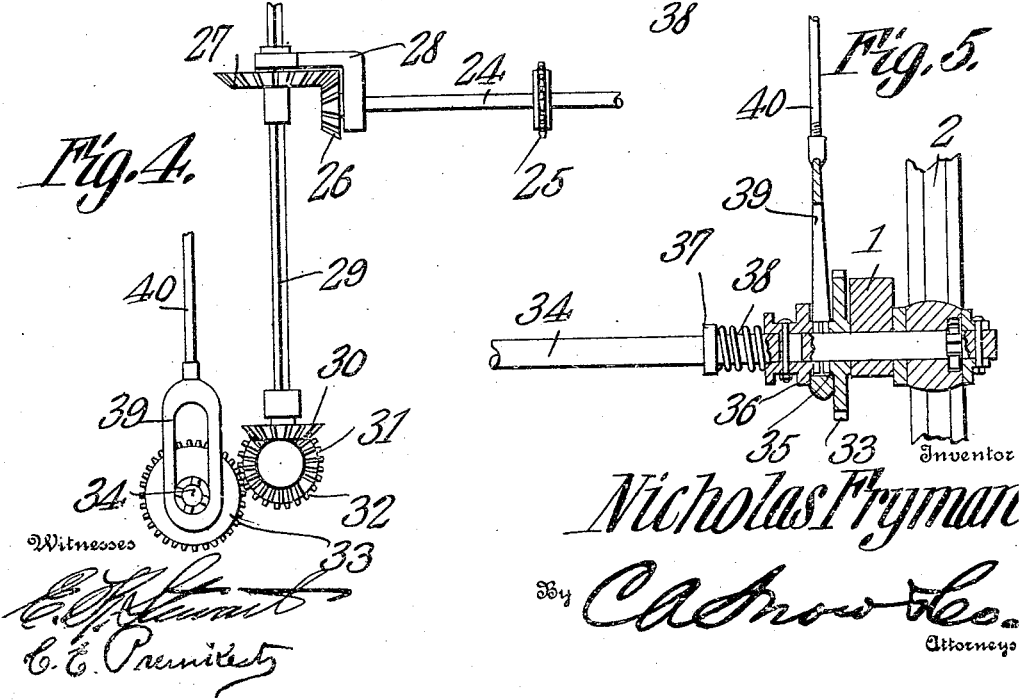
Inventor
Nicholas Fryman
By C. A. Snow & Co.
Attorneys
Witnesses

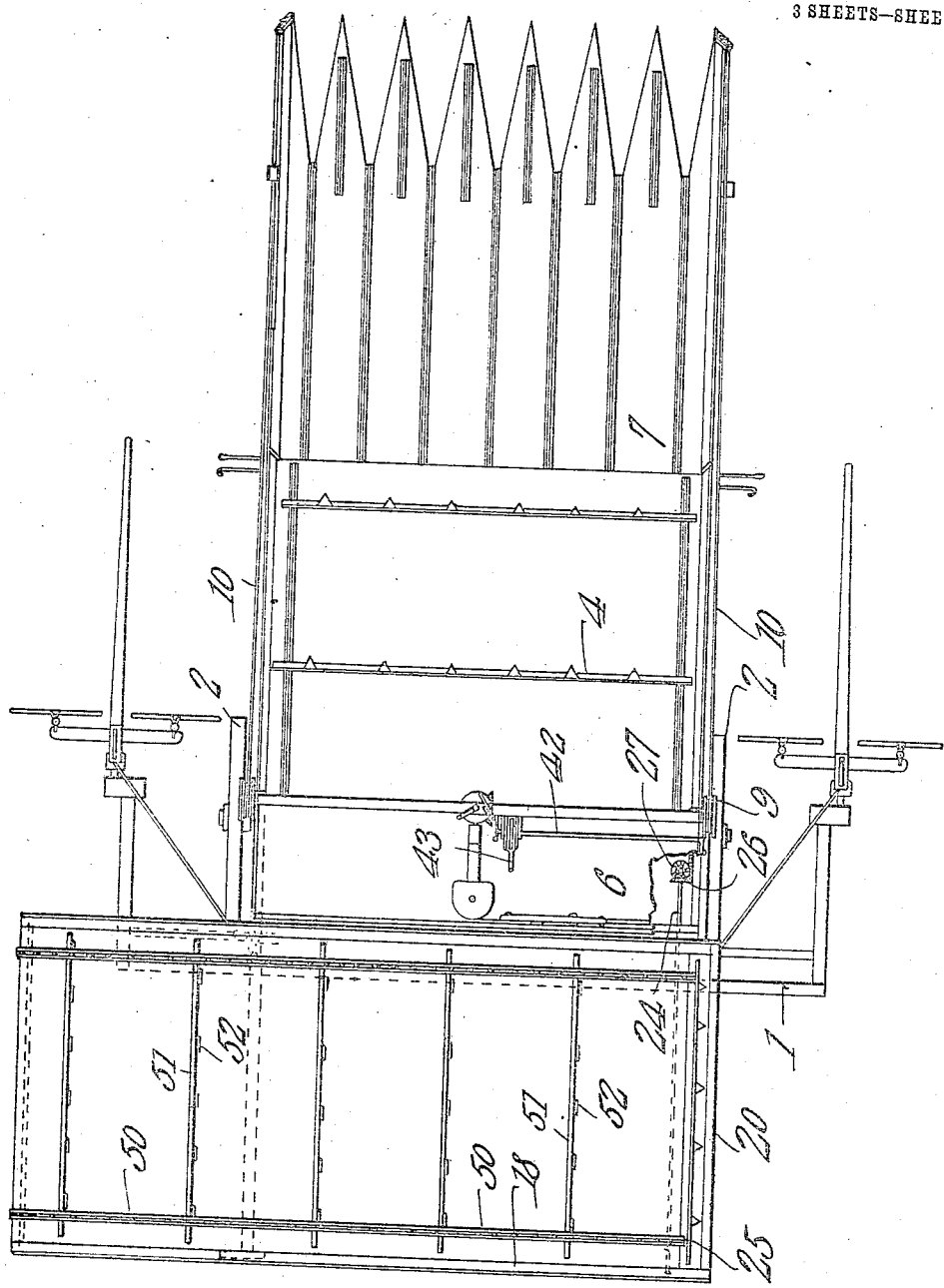

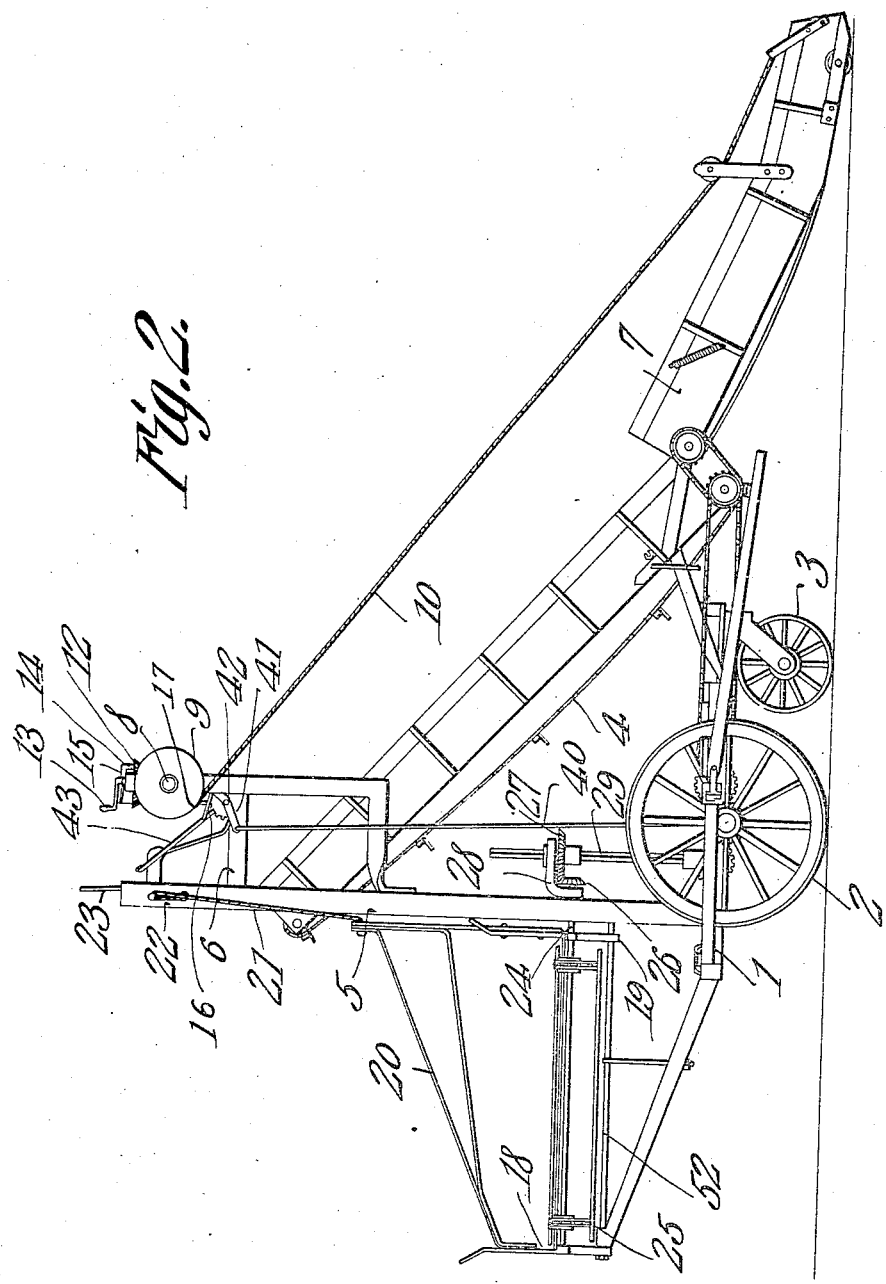

UNITED STATES PATENT OFFICE.

NICHOLAS FRYMAN, OF BOWDON, NORTH DAKOTA.

HAY-GATHERER.

943,533.  Specification of Letters Patent.  Patented Dec. 14, 1909.

Application filed July 17, 1909. Serial No. 508,122.

*To all whom it may concern:*

Be it known that I, NICHOLAS FRYMAN, a citizen of the United States, residing at Bowdon, in the county of Wells and State of North Dakota, have invented a new and useful Hay-Gatherer, of which the following is a specification.

This invention has relation to hay gatherers, and it consists in the novel construction and arrangement of its parts, as hereinafter shown and described.

The object of the invention is to provide a gatherer as indicated, which includes means for gathering and elevating the hay, and for depositing the same in a receptacle. An endless conveyer is arranged for orbital movement along the said receptacle, and means is provided for causing the said conveyer to so move at desired intervals. Also means is provided for tilting the receptacle when it is desired to unload the same. The hay thus gathered may be deposited upon the ground in the form of shocks or piles, or may be dropped from the receptacle into a wagon-body which may be carried at the side of the gatherer.

In the accompanying drawings:—Figure 1 is a top plan view of the hay gatherer. Fig. 2 is a side elevation of the same. Fig. 3 is a rear end elevation of the same. Fig. 4 is a detailed side elevation of a power transmission mechanism used upon a hay gatherer. Fig. 5 is a sectional view of a clutch mechanism used upon the hay gatherer.

The hay gatherer comprises a frame 1, which is mounted upon supporting wheels 2 and a castered truck 3. An inclined elevator 4 is mounted upon the platform or frame 1, and means is provided for operating the said elevator from the wheels 2, which support the frame. A derrick 5 is erected upon the frame 1 and, at its upper end, supports a deck 6. A gatherer 7 is pivotally attached to the lower forward end of the trunk of the elevator 4, and a shaft 8 is journaled upon the superstructure of the deck 6. Drums 9 are fixed to the ends of the shaft 8 and cables 10 are arranged to wind about the said drums. The lower forward ends of the said cables are connected with the forward portion of the gatherer 7. A beveled gear-wheel 11 is fixed to the shaft 8 and meshes with a beveled gear-wheel 12, which is journaled upon the superstructure of the deck 6. The wheel 12 is provided with a crank-handle 13, and upon its upper surface is provided with a series of teeth 14. A pawl 15 is pivoted upon the superstructure of the deck 6 and is adapted to engage the teeth 14 of the wheel 12. A treadle lever 16 is fulcrumed upon the deck 6, and is connected by means of a rod 17 with that end of the pawl 15 opposite the end thereof which engages the teeth 14.

It will be observed that when an operator depresses the free end of the lever 16 the rod 17 will be moved longitudinally, and the pawl 15 will be swung upon its pivot, so that its end will disengage the teeth 14 carried by the wheel 12. Thus the said wheel 12 is rendered free, and, by turning the crank 13, the said wheel may be rotated, whereby the shaft 8 is rotated through the intermeshing wheel 11. Thus the drums 9 are rotated and the cables 10 may be wound thereon or unwound therefrom. Thus means is provided for raising and lowering the gatherer 7 and for holding the same at a desired adjusted position.

A trunk 18 is provided at a point intermediate of its ends, but nearer one end than the other, with a bearing 19. The said bearing 19 is pivotally attached to one of the side pieces of the derrick 5. A bracket 20 is attached to one end of the trunk 18, and the lower end of a cable 21 is attached to the said bracket 20. The said cable passes up over a pulley 22 at the upper portion of one of the side pieces of the derrick 5, and the upper end of the said cable is fixed to a lever 23, which is fulcrumed upon the deck 6. A shaft 24 is journaled for rotation at one end of the trunk 18, and is provided with sprocket wheels 25. A beveled pinion 26 is fixed to the forward projecting end of the shaft 24, and meshes with a beveled pinion 27, which is journaled upon a bracket 28, which bracket depends from the trunk 18. The pinion 27 is provided with a non-circular central perforation which receives a non-circular shaft 29. The pinion 27 is slidably mounted upon the shaft 29, but is confined to rotation with the same. A beveled pinion 30 is fixed to the lower end of the shaft 29 and meshes with a pinion 31, which is journaled at the side of the frame 1. The pinion 31 is provided with a set of gear teeth 32, which mesh with a gear-wheel 33 mounted upon the axle 34, upon which the supporting wheels 2 are mounted. The wheel 33 is provided with a clutch hub 35. A clutch member 36 is feathered to the end portion of the axle 34 and is adapted, at times, to engage the clutch hub of the wheel 33. A collar 37 is fixed to the end portion of the axle 34, and a coiled spring 38 is interposed between said collar and the inner face of the clutch member 36. A wedge-shaped loop 39 is interposed between the adjacent faces of the clutch members 36 and gear-wheel 33, and when the said loop is elevated its transverse dimension is of such magnitude as to disengage the clutch member 37 from the hub of the wheel 33, but when the said loop is lowered its transverse dimension is such as to permit the clutch member 36 to engage the hub of the wheel 33, subject to the tension of the spring 38. A rod 40 is connected at its lower end with the upper end of the wedge-shaped loop 39, and at its upper end is pivotally connected with a crank extremity 41 of a shaft 42. The shaft 42 is journaled upon the deck 6 and is connected with an operating lever 43, which is fulcrumed upon the said deck.

From the above description it will be seen that, by swinging the lever 43, the shaft 42 may be partially rotated, and the rod 40 is moved longitudinally. Thus the loop 39 is moved vertically, whereby the clutch member 36 may be permitted to engage the hub of the wheel 33, or forced away from the same.

Bearings 44 are slidably mounted in that end of the trunk 18 opposite the end thereof at which the shaft 24 is journaled, and a shaft 45 is journaled for rotation in the bearings 44. Bolts 46 are slidably mounted in guides 47, which, in turn, are mounted upon the sides of the trunk 18, and the said bolts are provided with eyes 48, which receive the end portions of the shaft 45. Nuts 49 are screw-threaded upon the bolts 48, and are adapted to bear against the faces of the guides 47. Sprocket wheels 49 are mounted upon the shaft 45, and endless sprocket chains 50 pass around the wheels 25 and 49. The sprocket chains 50 are connected by cross-bars 51, upon which are mounted teeth 52. The sprocket chains 50 and bars 51 constitute an endless conveyer which travels in an orbit about the bottom of the trunk 18.

The operation of the hay gatherer is as follows: As the gatherer is drawn along the surface of the ground the hay is collected by the gatherer proper, 7, and transmitted back to the elevator 4, which is in a constant state of movement, and the hay is carried up the trunk of the said elevator, and, from the delivery end thereof, falls into the trunk 18 and upon the upper run of the conveyer located upon the bottom thereof. When a sufficient quantity of hay has been accumulated in the trunk 18 an operator upon the deck 6 swings the lever 43, whereby the rod 40 is moved longitudinally, as above described, and the clutch member 36 is permitted to engage the hub of the wheel 33. Thus the said wheel 33 is caused to rotate with the axle-shaft 34, and rotary movement is transmitted from the said wheel 33 through the intermeshing wheel 31 and wheel 30 to the vertically disposed shaft 29. From the said shaft 29 rotary movement is transmitted through the intermeshing pinions 27 and 26 to the shaft 24, and thus the conveyer, of which the chains 50 and cross-bars 51 constitute the component parts, is caused to move along the bottom of the trunk 18, and the accumulated hay in the said trunk is moved along the shaft 45 which is at the delivery end of the said trunk. At the same time the operator swings the lever 23, which draws the cable 21 longitudinally, and elevates that end of the trunk 18 at which the bracket 20, is located. During the swinging movement of the trunk 18, as stated, the said trunk moves upon the pivot located in the bearing 19 as an axis, and, consequently, the delivery end of the said trunk is lowered, while the other end thereof is elevated. As the upper run of the conveyer of which the chains 50 and cross-bars 51 form component parts, moves toward the delivery end of the said trunk, the tilting of the trunk, as indicated, facilitates and promotes the discharge of the accumulated hay from the trunk 18. The hay may be deposited upon the ground in the form of a pile or shock, or it may be deposited in the body of a wagon which is traveling at the side of the hay-gatherer. After the hay has been dropped from the delivery end of the trunk 18, the operator swings the lever 23 in the opposite direction from that in which he swings the lever to elevate the receiving end of the trunk 18, and the said trunk is permitted to assume its normal horizontal position below the delivery end of the elevator 4. He then swings the lever 43 in a direction opposite to that above indicated, and the thicker portion of the loop 39 passes between the clutch member 36 and the wheel 33, and thus the said clutch member 36 is forced away from the clutch hub of the said wheel against the tension of the spring 38. The parts remain in these positions until the dumping operation above indicated is repeated. The said dumping operation may be accomplished at such intervals as the operator desires.

Having described my invention, what I claim as new, and desire to secure, by Letters Patent, is:—

1. A hay gatherer comprising an elevator, a receptacle pivotally mounted below the delivery end of the elevator, means for raising the receiving end portion of the receptacle, a conveyer arranged to move along the bottom of the receptacle, a shaft journaled in the receptacle for actuating the conveyer, a vertically disposed shaft journaled for rotation upon the frame of the hay gatherer, means operatively connecting the vertically disposed shaft with the shaft journaled upon the receptacle, and a traction means supporting the gatherer, and means for operatively connecting the said traction means with the vertically disposed shaft.

2. A hay gatherer comprising an elevator, a pivotally mounted receptacle located below the delivery end of the elevator, a conveyer arranged for movement along the bottom of the receptacle, means for raising the receiving end portion of the receptacle, a shaft journaled in the receptacle and adapted to operate the conveyer, a vertically disposed non-circular shaft journaled for rotation upon the frame of the gatherer, intermeshing gear-wheels, one of which is fixed to the shaft upon the receptacle, and the other of which is slidably mounted upon the vertically disposed non-circular shaft, a traction means supporting the gatherer, and means for operatively connecting the vertically disposed shaft with the traction means.

3. A hay gatherer comprising an elevator, a receptacle pivotally mounted below the delivery end of the elevator, means for raising the receiving end portion of the receptacle, a conveyer arranged to move along the bottom of the receptacle, a shaft journaled in the receptacle and adapted to operate the conveyer, a vertically disposed non-circular shaft journaled for rotation upon the frame of the gatherer, intermeshing gear wheels, one of which is fixed to the shaft upon the receptacle, and the other slidably engaging the vertically disposed non-circular shaft, a traction means supporting the hay gatherer, and a manually operable clutch mechanism for operatively connecting the vertically disposed shaft with the said traction means.

In testimony that I claim the foregoing as my own, I have hereto affixed my signature in the presence of two witnesses.

NICHOLAS FRYMAN.

Witnesses:
   JOHN F. WAKE,
   FRED JANSONIUS.